United States Patent [19]

Walker et al.

[11] Patent Number: 5,779,549

[45] Date of Patent: Jul. 14, 1998

[54] DATABASE DRIVEN ONLINE DISTRIBUTED TOURNAMENT SYSTEM

[75] Inventors: Jay S. Walker, Ridgefield; James A. Jorasch, Stamford, both of Conn.

[73] Assignee: Walker Assest Management Limited Parnership, Samford, Conn.

[21] Appl. No.: 635,576

[22] Filed: Apr. 22, 1996

[51] Int. Cl.⁶ .................................................. A63F 9/22
[52] U.S. Cl. ............................... 463/42; 463/23; 463/25; 463/29
[58] Field of Search .................................. 463/1, 30, 40, 463/41, 42, 29; 364/410, 411; 340/323 R

[56] References Cited

U.S. PATENT DOCUMENTS

| | | | |
|---|---|---|---|
| 4,592,546 | 6/1986 | Fascenda et al. | 463/40 |
| 5,083,271 | 1/1992 | Thacher et al. | 364/411 |
| 5,114,155 | 5/1992 | Tillery et al. | 463/42 |
| 5,213,337 | 5/1993 | Sherman | 463/40 |
| 5,283,734 | 2/1994 | Von Kohorn | 463/40 |
| 5,359,510 | 10/1994 | Sabalianskas | 364/410 |
| 5,558,339 | 9/1996 | Perlman | 463/42 |
| 5,593,349 | 1/1997 | Miguel et al. | 463/1 |

FOREIGN PATENT DOCUMENTS 4222896  1/1994  Germany.

Primary Examiner—Jessica Harrison
Assistant Examiner—Mark A. Sager
Attorney, Agent, or Firm—Morgan & Finnegan LLP; Jeffrey L. Brandt

[57] ABSTRACT

A method and a system for a distributed electronic tournament system in which many remotely located players participate in a tournament through input/output devices connected to a central controller which manages the tournament. The method includes the steps of (a) uniquely identifying a player communicating with the central controller via an associated input/output device; (b) responding to payment of an entry fee by the player for allowing the player to participate in a tournament occurring within a fixed time window via an associated input/output device; (c) accessing a database to store in the database player information that is generated as the player participates in the tournament, such information being available for use in a subsequent tournament, which is administered by said controller and in which the player participates; and (d) awarding the player a prize for achieving a pre-established performance level in the tournament. In another preferred embodiment, the method further includes the steps of determining whether the player has been qualified to advance to a subsequent game session, in which at least one player is eliminated from the previous game session; and permitting each player qualified to a subsequent game session to participate in that game session. The system includes software and hardware to implement the method steps.

12 Claims, 7 Drawing Sheets

5,779,549

DATABASE DRIVEN ONLINE DISTRIBUTED TOURNAMENT SYSTEM

FIELD OF THE INVENTION

The present invention relates generally to games, and more particularly to online electronic tournament games.

BACKGROUND

Competitive games are a popular form of recreation. From the Olympics to the Super Bowl to backyard volleyball games, competitive games consume a large portion of our free time. Whether watching or participating, the allure is undeniable. In addition to the competitive sports, intellectual competitions such as chess or bridge tournaments are also popular.

These competitions remain popular because whether a participant or spectator, one is involved. They require people to meet at a central location and specific time, providing a sense of community and camaraderie, as well as a place to socialize. A typical chess tournament, for example, might have fifty players meeting at a central playing site.

Such tournaments and competitions suffer from several drawbacks, however, as participants may have to travel considerable distance to get to the playing site and may require expensive overnight accommodations when the tournament lasts more than one day. The start times for most tournaments must also be fixed in advance. The chess players, for example, might meet at 9:00 AM for the start of the first round. This forces all participants to adhere to the same schedule, an increasingly difficult proposition in today's busy world. Furthermore, facilities used to host the tournament, such as hotel meeting rooms, banquet halls, and auditoriums, represent a significant expense to the tournament organizers.

To ensure that the rules of the tournament are upheld, most competitions require proctors, arbiters, referees, and the like. Retaining such people can add significant costs to competitions. There may also be a limited supply of individuals qualified to oversee the tournament. For example, if there are only two sanctioned backgammon tournament directors in a city, the backgammon tournament might have to be canceled if both are sick on the day of the competition. Such cancellations can be costly for those participants planning on traveling to the tournament, who would have to cancel flights and hotel registrations.

Tournaments geared to a narrower subset of tournament players (niche tournaments) are often economically unfeasible because of the high costs associated with obtaining playing facilities. While it may be possible to hold a martial arts tournament in a city, it may be hard to hold a tournament for a specific subset of the martial arts such as Aikido. The few players that would participate would not justify the cost of the facilities.

Electronic tournaments allow participants to "meet" in cyberspace, competing at a virtual location accessible to any player at any time. Because no travel is required, many of the disadvantages of physical tournaments are eliminated, while maintaining the sense of camaraderie.

Online games and contests have existed almost since online networks were created. The first online services available to a user with a personal computer and a modem were bulletin board systems or BBSs. They started appearing in the early 1980s and exploded in popularity along with the growth of the personal computer. The most primitive of these systems allowed users to share files and exchange e-mail. The ability to conduct electronic games was quickly added as enthusiasts joined the systems. BBSs were usually operated by computer enthusiasts more as a hobby than as a commercial enterprise. In the late 1980s, corporations began creating online services that could handle thousands of users simultaneously. Online services such as Prodigy, CompuServe, and America Online brought a new level of professionalism and sophistication to the industry. Inelegant text-based user interfaces were replaced with graphical front ends that no longer required users to memorize arcane commands or codes. Game play became more popular as the software became increasingly user-friendly.

One of the companies providing games in this new environment is NTN Communications. They offer a trivia game on America Online in which players compete by answering a series of questions. There are five possible answers, with 1000 points being awarded for a correct answer. The player is given a limited amount of time to come up with an answer, and fewer points are awarded for a correct answer as time passes. At the end of the contest, the top scores are displayed to all competitors. The game has a major drawback, however, in that there are no prizes awarded to players. The competitive drive is diminished when there is no prize for winning. It's like playing a game of poker without using money.

To increase player interest, several companies have begun to offer online contests with cash prizes. Yoyodyne Entertainment provides an email-based trivia game that is available through the Internet and several online services. Players receive questions via email and must submit their answers before a deadline, which is usually a day or two later. Points are awarded for each correct answer and deducted for each incorrect answer. The winner is the person with the highest score at the end of the contest.

Interactive Imaginations also developed online contests for prizes. They created the Riddler site on the World Wide Web. Users are offered a selection of games, including trivia and puzzle games. Like the Yoyodyne site, prize amounts are necessarily limited because there are no entry fees.

One company has combined both entry fees and prizes to generate new potential customers. Bert & Associates created an options trading game in which contestants pay an entry fee in order to become eligible for the prizes. The game was merely a peripheral element of their business, however, meant only to attract customers to their brokerage business.

Another limitation of the games run by Yoyodyne and Interactive Imaginations is that there is no continuity among the games. The results of one game have no impact on the results of another game. Each game is an independent event; they are not linked together into a more continuous game experience. After registering for one game, the process must be repeated for future games. A player who has become an expert in a trivia game is able to enter the same trivia games again and again, monopolizing the top prizes. Game organizers are unable to prevent this since there are no effective controls on who can register for a game. Games geared exclusively to experts are impossible as there is no effective way to screen the qualifications of participants.

Rating systems, popular in chess and backgammon games, are impossible to implement without a way to track a player's progress over a number of games. Handicap systems popular in golf games are similarly restricted in that player results must be tracked over a series of games, not just one game.

Online games also lack effective reservation systems; players simply log on at the appropriate time and begin play.

If game organizers want to restrict the number of players, they are forced to establish an arbitrary limit on the number of entrants. If such a limit is enforced, however, players will have no way to know in advance whether or not they will be able to register at the time the tournament starts.

Existing electronic games also lack the implementation of levels, a progression of increasing difficulty throughout the competition. What is missing is the excitement of elimination found in virtually every other competitive environment. To date, all online contests have involved a single game session. In a trivia game, players answer a series of questions and receive a score based on the number of correct responses. The winner is the player with the highest score. In a puzzle contest, the first correct solution wins.

The world of professional sports demonstrates the desirability of levels. Professional basketball, for example, consists of a regular season followed by postseason play. A certain number of teams qualify for post-season play based on their regular season records. These teams then play each other in an elimination format until two teams remain to play in the final series that determines the winner. Advancement to the next round of post-season play depends on a team's performance in the previous round. There is no doubt that the tournament structure adds a great deal of excitement not only to each of the post-season games, but also to the games at the end of the regular season as well.

Imagine a basketball season in which the champion was determined by the regular season record alone. The last games of the season would be irrelevant if the current leader were many games ahead of the nearest team. Spectator and player interest would drop dramatically. Teams whose scores would place them in the middle of the pack could be out of contention with dozens of games remaining. There would be little incentive to press for a win in the remaining games. Key competitive matchups might also be missed. Two teams with top records that were never scheduled to play each other would vie for the title without ever having played. Player curiosity as to which team was really the best would not be satisfied without a head to head competition.

All professional sports use an elimination process to make the game more exciting for participants as well as spectators. Professional football, baseball, basketball, and hockey all have regular seasons followed by post-season play in which teams are eliminated from contention. Instead of having a regular season, professional tennis offers a series of games in which the field narrows through a process of elimination until ultimately one competitor remains and is declared the winner. Professional golf tournaments have a cut in which the field is dramatically cut back before the final round of competition begins.

It should be apparent from the foregoing that there is a need for an electronic gaming system in which players from different locations can participate in and win awards. The system should not just support stand-alone games, but should also support the coordination of multiple games in which information from one game impacts future games.

SUMMARY OF THE INVENTION

An object of the present invention is to provide methods and devices for effectively operating multiple database-driven distributed electronic game tournaments for remotely located players. It provides numerous advantages over existing tournament systems; such as simplifying the collection of entry fees and the payment of prizes, as well as allowing for rating and handicap systems.

In the invented system, players pay entry fees for the right to compete for substantial prizes in electronic tournaments. Unlike existing tournament systems, the present invention allows for the coordination of multiple tournaments, making each tournament part of a whole rather than a stand-alone individual event.

In one preferred embodiment, a central controller manages the tournament system, coordinating both the players and game software with which the players compete. The system uniquely identifies each player as they log on, authenticating the associated input/output device that is connected to the central controller. This unique identifier allows other players to know whom they are competing against. Each player typically pays the system an entry fee before participating in a particular tournament, with payment delivered through the associated input/output device. The tournament begins and ends within a fixed time window, typically measured in hours or minutes.

After each tournament is over, the system evaluates player performance, awarding prizes to those players achieving pre-established performance levels.

Due to the complexity of coordinating multiple tournaments, one preferred embodiment includes the use of a database. In this embodiment the central controller accesses the database to store player information that is generated as the player participates in the tournament. Such information is available for use in a subsequent tournament, which is administered by the controller and in which the player participates.

In another preferred embodiment with the central controller, each tournament game is broken down into a series of game sessions in which players must qualify in one game session in order to be eligible to play in the next. This elimination format significantly increases tension and enhances excitement in the games, since only the best players are left fighting for the top prizes in the final game session. In such an embodiment, each subsequent game session has at least one fewer player than a previous game session.

Other aspects and advantages of the present invention will become apparent from the following detailed description, which, when taken in conjunction with the accompanying drawings, illustrates by way of example the principles of the invention.

The numerals in FIGS. 1–9 are assigned to similar elements in all the figures. Embodiments of the invention are discussed below with reference to FIGS. 1–9. Those skilled in the art will readily appreciate that the detailed description given herein with respect to these figures is for explanatory purposes, as the invention extends beyond these limited embodiments.

DETAILED DESCRIPTION OF THE INVENTION

Figure 1:
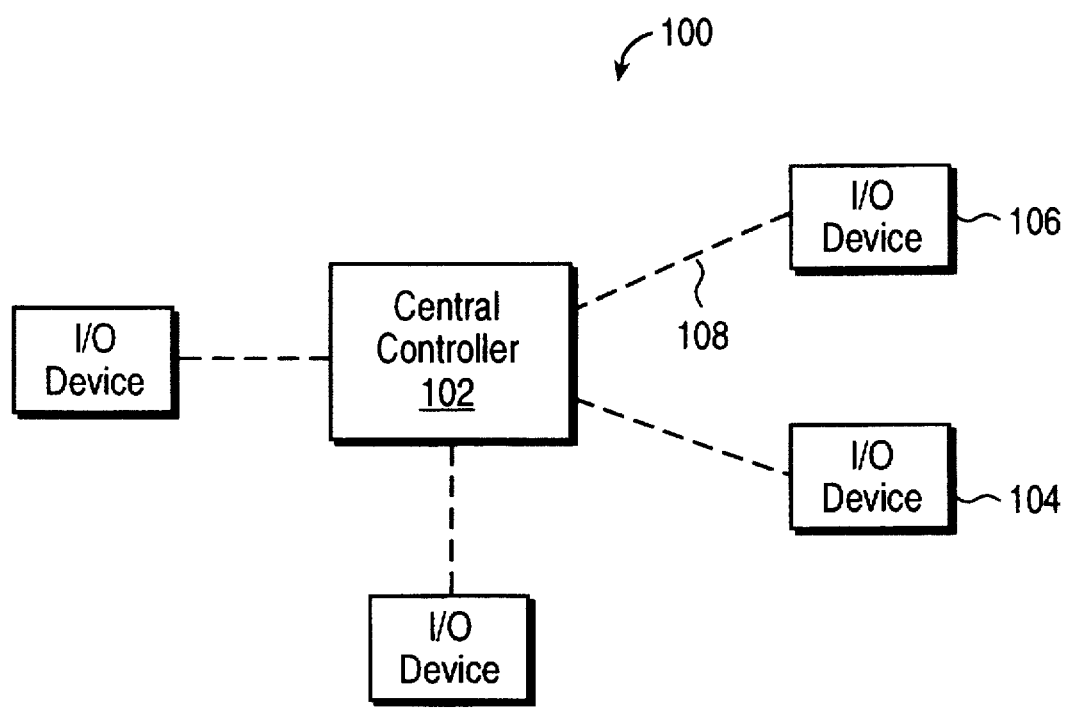
FIG. 1 shows a distributed electronic tournament system in the present invention.

FIG. 1 shows a distributed electronic tournament system 100 with a central controller 102 connected to a number of input/output (I/O) devices, 104 and 106, in the present invention. The input/output device may be a video gaming console, a personal computer, handheld electronic device, and the like. The central controller may be a workstation, a minicomputer, or other type of computation device, typically in the form of a server computer connected to a public or private network. The I/O devices are remotely located from the central controller to allow participation in a tournament to be distributed. The I/O devices preferably are connected to the central controller, at least when the I/O devices are involved in games. Such connection may be through a wireless telecommunication network or through a ground-based network 108, such as the Internet. While online, the I/O device typically communicates with the network via a public or private switched network such as the circuit switched public telephone network. The central controller has software which it uses to manage the tournament. In one preferred embodiment, the I/O devices are personal computers connected to an online service such as America Online. The central controller is a workstation computer on America Online that coordinates the tournament activities.

The tournament databases are preferably relational, in which fields from one database are linked to fields of at least one other database. These databases are controlled by a database management system (DBMS) which organizes, stores, and retrieves the tournament's data/information. The DBMS communicates with the operating system to read data from the storage device. The database is associated with or resides at the central controller.

The operating system software runs the central controller hardware and controls and coordinates all of the tournament software applications. These software applications include programs for running the tournament games, registering players, accepting entry fees, and coordinating prize payment. Tournament games might be commercially available software programs such as Microsoft Golf, or proprietary game software designed exclusively for online tournament play.

The above hardware and software are configured to implement the tournaments in the present invention. Each tournament has a game format, one or more game sessions, and challenges as will be described in more detail later. The game format is the broad category that describes the type of game being played.

Typically, the database system is managed by the central controller and communicates with the game software used to conduct the actual tournament. The game software handles operational issues such as displaying the game format on the I/O device screen, calculating scores, controlling player access to tournaments, etc.

Figure 2:
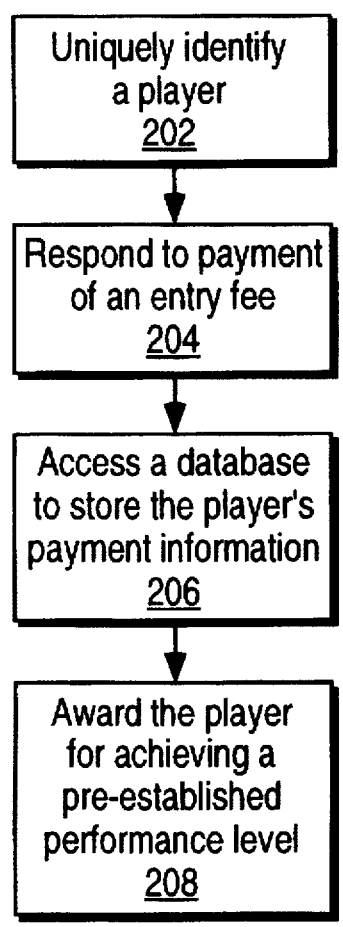
FIG. 2 shows one preferred embodiment implementing the present invention.

FIG. 2 shows one preferred embodiment 200 implementing the present invention. Although the control of the operations of the I/O devices and the central controller are typically incorporated into software code, such operations can also be embodied in hardware circuits to implement the invention. The preferred embodiment 200 includes: (1) process steps 202 for uniquely identifying a player, who communicates with the central controller via an associated input/output device; (2) process steps 204 responsive to payment of an entry fee by a player for allowing the player to participate in a particular tournament via an associated input/output device; (3) process steps 206 for accessing a tournament database to store player information that is generated as the player participates in the tournament, such information being available for use in a subsequent tournament, which is administered by said controller and in which the player participates; and (4) process steps 208 for awarding a player a prize for achieving a pre-established performance level.

These process steps are typically implemented by the central computer controller in order to make tournament operations faster and more cost efficient. A number of different preferred embodiments of the above steps will be described to provide a general view of methods to implement each set of process steps. The different ways serve only as examples. After the general overview, more detailed descriptions and examples follow.

Figure 3:
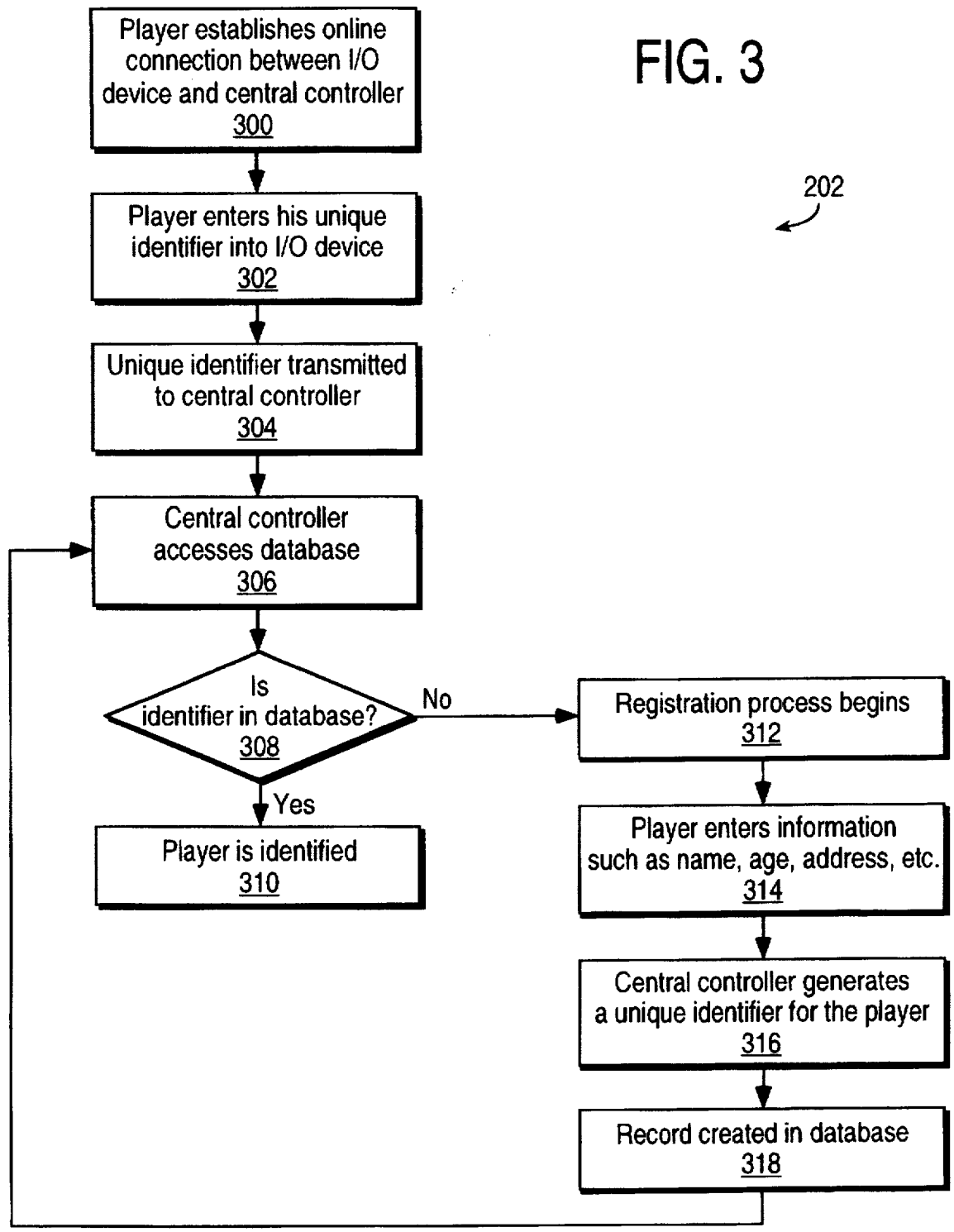
FIG. 3 shows one preferred set of steps to uniquely identify a player in the present invention.

The process steps 202, as shown in FIG. 3, for uniquely identifying a player preferably include the steps of a player establishing 300 an online connection between the I/O device and the central controller. The player enters 302 a unique identifier through the associated I/O device. The identifier is assigned by the central controller or chosen by the player. The identifier can be his name, social security number, account number, password of his choosing, etc. It is important to note that although the player may be uniquely identified to the central controller, he may at the same time remain anonymous with respect to the other competitors in the tournament. The unique identifier is then communicated 304 to the central controller via the communication network. The central controller accesses 306 a database and searches 308 the records to determine whether or not the identifier already exists. If the record already exists, the player is identified 310; when the record does not already exist the registration process 312 begins in which the player enters 314 information such as name, age, address, payment preferences, etc. The central controller generates 316 a unique identifier for the player and stores 318 it in the database.

Figure 4:
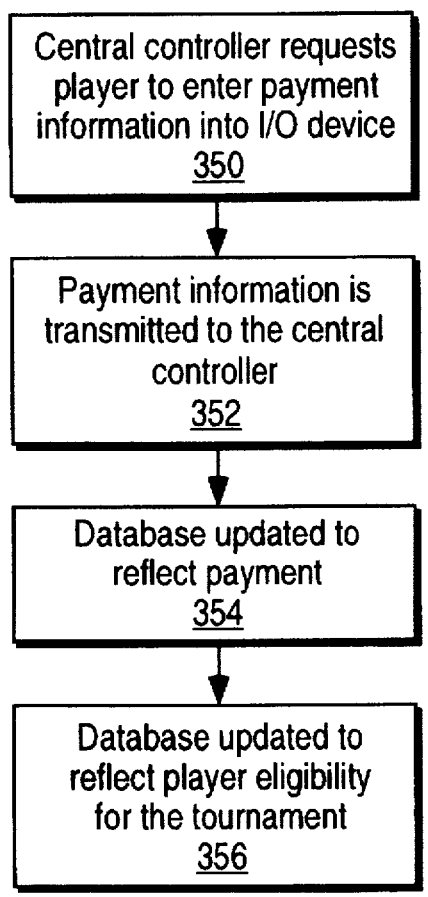
FIG. 4 shows one preferred set of steps to respond to payment of an entry fee in the present invention.

In one preferred embodiment, a player must pay an entry fee to the central controller through the associated I/O device before he is allowed to participate in a tournament. The process steps 204, as shown in FIG. 4, responsive to the payment of an entry fee to a tournament typically include the steps of the central controller requesting the player to enter 350 payment information into the I/O device. Details of payment methodologies are described below in more detail. The payment information is communicated 352 to the central controller via the communication network. The central controller receives and updates 354 the player's record in the database to reflect that payment has been made and also updates 356 the player's database record to reflect that the player is eligible to participate in the tournament. In another preferred embodiment, the controller does not have to request information, and no payment information is communicated to the controller. This may be because the player has played before, and the controller is aware of the player's preferences as described below.

After determining that the player is eligible to play, the controller sends an acknowledgment message to the associated I/O device. When the tournament starts, the player is able to begin play.

Figure 5:
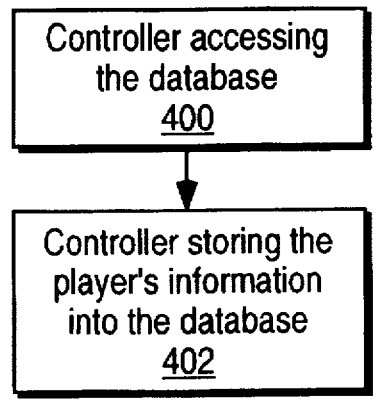
FIG. 5 shows one preferred set of steps to access player information collected from prior tournaments.

FIG. 5 describes the process steps 206 for accessing a tournament database to store player information. The central controller accesses 400 the tournament database and then stores into the database 402 the player's information generated by the player as the tournament progresses.

Player information stored in the database includes entry fee data, handicap and rating information, player performance data and player preferences. Storing entry fee data, such as a credit card number or bank account number, streamlines the payment process for subsequent tournaments. When paying for a tournament, the player simply provides his unique identifier to the central controller, which pulls his credit card number from the database and credits his card for the appropriate entry fee amount. Because many online environments have yet to implement effective transaction security protocols, reducing the number of times a credit card number is transmitted enhances security.

Player performance data can also be carried forward from one tournament to the next. In addition to wins and losses, performance data can include accuracy rates, time required to answer, etc. If a player competes in five trivia tournaments, for example, his average accuracy rate is stored in a database. Such information is crucial in establishing handicap systems, which level the playing field by penalizing the better players and aiding the weaker players. A golf handicap, for example, allows a skilled player to compete with a relatively inexperienced player. Performance data can also be used to generate player ratings, similar to the Elo rating system used by the United States Chess Federation. Ratings are numeric values that represent the skill of the player. The central controller retrieves performance data from a database and applies an algorithm to determine the rating. A player's rating rises and falls depending on the results of his play. Ratings allow tournaments to be easily segmented by skill level.

Storing performance data allows the central controller to restrict eligibility to future tournaments. Certain tournaments, for example, may be available only to players having obtained a given level of performance in a number of qualification tournaments.

A database of performance data also allows inter-tournament prize pools in which a player is eligible for a prize based not on the results in a single tournament, but on a combination of tournaments. For example, in addition to a normal weekly prize, there may be a grand prize awarded to the player winning the greatest number of weekly prizes over a year period.

Continuity between tournaments is improved by storing player preferences. Once a player's preference for method of prize payment is established, for example, the central controller no longer needs to ask how the player wants to be paid. By storing player preferences for tournament formats, the central controller can send tournament details to a player when any tournaments of this type are scheduled in the future. Tournaments are also more fun for players when data are stored as to favorite opponents, allowing the central controller to better allocate players among tournament sections.

After player information is stored in the database, it is available for use in a subsequent tournament (administered by the central controller) in which the player participates.

Figure 6:
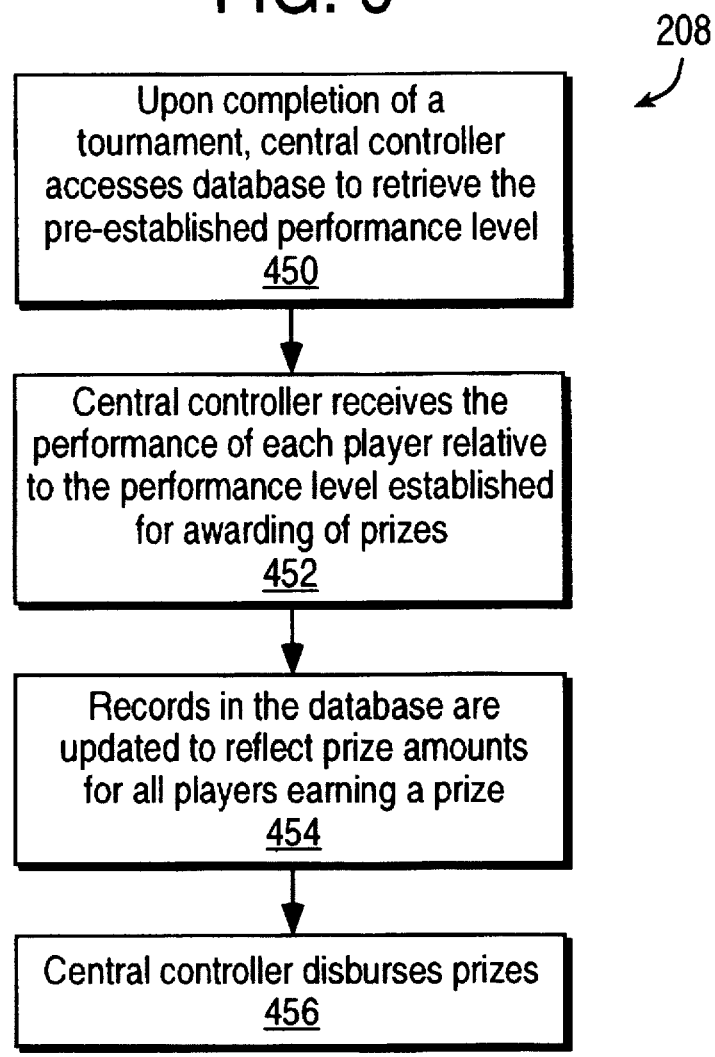
FIG. 6 shows one preferred set of steps to award a player a prize in the present invention.

The process steps 208, as shown in FIG. 6, for awarding a player a prize include the steps of the central controller accessing 450 the tournament database to retrieve the pre-established performance levels for the awarding of prizes. The central controller reviews 452 the performance of each player relative to the established performance requirements for the awarding of prizes. Preferably, the central controller updates 454 the winning player's database records to reflect that awards have been allocated to them. The central controller would then arrange for distribution 456 of the prize or prizes. This distribution process can be conducted through online or off-line methods.

Typically, the pre-established performance level is a relative ranking among players, such as the top five scores of the tournament. Performance criteria can also be fixed, however, with prizes paid to any player exceeding a certain score. A trivia tournament, for example, can award a prize to any player correctly answering at least twenty questions. Fastest time to completion is another way to establish performance levels.

Prizes awarded might be $100 for the player getting the top score, $50 for the player with the second highest score, and $25 for the third highest score. Alternatively, top scores could receive free entry fees to future tournaments, or points which may be accumulated and converted later into prizes. Although prizes are typically monetary in nature, prizes such as recognition may be equally appropriate. The recognition of being able to advance from one game session to the next game session can also be considered a prize.

Another preferred embodiment includes the step of determining whether a player has qualified for advancement to the next game session. This includes the step of the central controller reviewing the player's score after the just-concluded game session. This score is compared to the scores obtained by all of the other players in the same session. Based on these scores, the central controller produces a list of those participants qualifying for the subsequent session. There are a number of preferred embodiments for the qualifying criteria, including, for example, a minimum required score, a minimum average score over the last several game sessions, or the maximum score within a sub-group of players in the game session. Only those on the qualified list would be allowed to continue to play in the subsequent game session.

The central controller generates a list of players qualified for the subsequent game session. In one preferred embodiment, the number of players on the qualification list is at least one fewer than the number playing in the previous game session. Note that in the present invention, a game session includes one or more games with a group of players playing the games within an established time frame. In a trivia tournament of four game sessions, the first session may be composed of ten groups of fifty players each for a total of five hundred players. The second game session may comprise five groups of sixty players each for a total of three hundred players. Although the size of the playing group has increased from fifty to sixty, the overall number of players in the game session has dropped from five hundred to three hundred. In this embodiment, it is at the point of elimination that the boundary of game sessions is defined.

In one preferred embodiment, the central controller also prevents those players not qualified to play from participating in a tournament. The central controller generates a game session password which is distributed only to qualified players. Without the correct password, non-qualified players are unable to compete. In one preferred embodiment, players must enter an electronic "chat room" (of the type commonly found on most commercial online systems) in order to obtain the game questions. Access to this room is password protected so that only authorized players are allowed access to the questions. The central controller might also enforce qualification rules by terminating a player's online connection, or by merely preventing a non-qualified player from winning any prize.

The following illustrates a number of more detailed examples of the tournament system. Some of these examples also show different preferred embodiments of the system.

In terms of game formats, examples include strategy games (chess, checkers, bridge, etc.) and puzzles (crossword, jigsaw, etc.). Each tournament has one or more game sessions which are sub-units of the tournament. After completion of the first game session, one or more players may be eliminated from the tournament. Each game session is further broken down into one or more challenges, which are the puzzles, trivia questions, or games in which the players compete. A trivia tournament, for example, may have three game sessions scheduled for start times of 1:00 PM, 2:00 PM, and 3:00 PM. Each game session may have twenty challenges—in this case multiple-choice questions. After a player completed the twenty questions of the first game session, the central controller would determine whether or not the player had qualified to advance to the next round at 2:00 PM. After the twenty questions of the 3:00 PM game session a winner would be determined and prizes would be awarded. In another example, a golf tournament may be held in which there is one game session and nine challenges--in this case nine holes of electronic golf. The player's score for the tournament is simply the total number of strokes taken to complete the nine holes.

Each game session takes place within a fixed time window, and thus has an established start and stop time. The first game session of the puzzle tournament, for example, may start at 1:00 PM and end at 3:00 PM. For some game formats, however, all players do not have to start and stop at the same time. Some players may start later than others, and some players may finish earlier than others. As the tournament progresses, more and more players are eliminated. Although the final game session typically determines the winners for the tournament, merely advancing from one game session to the next may qualify the player for a prize or recognition. Typically, game sessions become progressively harder as the tournament continues.

Although the above preferred embodiments have described tournaments based on games of skill, the same tournament structure is equally applicable to games of chance or to games that involve a combination of skill and chance. Computer golf games, for example, require a great deal of skill in the form of hand/eye coordination, but may also contain elements of chance, such as a randomly generated wind speed.

In one preferred embodiment, the number of players for each game session has no upper limit and is constrained only by the availability of I/O devices. In another preferred embodiment, the number of players is restricted by an established ceiling, restricting tournament registrations to a fixed maximum. Each tournament thus has a number of open positions which are gradually filled as players register. Although these positions are typically available on a first-come first-served basis, positions can be set aside for a select group of premium players who may be designated as such by the central controller. These positions are held open until a fixed time before the start of the game session. At that preset time, the reserved positions are made available to all players, including those not within the selected group. In a tournament limited to one hundred players, for example, five positions may be held for premium players. After the ninety five open positions are filled, only registrations from premium players are accepted. If no premium players take these positions, they may be made available to all players twenty minutes before the start of the first game session.

Tournaments can also accommodate team play. The unique identifier for a player then becomes associated with an identifier for a team so that the central controller can incorporate the player into a team. Scores of the individual members of a team may be averaged to generate a team score, or perhaps the top score from each team represents the team score. In addition to a player's database record indicating the names of any teams that he is on, there might also be a database record for each team listing the players that are members.

There are, of course, many different game formats that lend themselves to electronic online tournament competition. The following eight general categories provide a brief summary.

Dexterity games are perhaps the most common games seen in an online environment. These games require hand/eye coordination and are usually patterned after arcade video games or personal computer games. Examples include martial arts fighting games or flight simulators. Such games are often referred to as "twitch" games since even the slightest mistake in coordination can prove fatal to a player's chances. Another category of dexterity games is sports games. Computer golf, for example, is played on millions of personal computers. Players enter parameters such as the type of club used, the placement of their feet, the force with which they hit the ball, the direction of the shot, etc. The computer calculates where the ball should go and displays the new ball position on the screen of the I/O device. In an online tournament, players might compete in a "closest to the pin" tournament. The above parameters would be sent to the central controller which calculates where the ball landed. The player whose ball lands closest to the pin, for example, may win a prize or qualify to advance to a subsequent game session.

The game of golf also lends itself to hole-in-one competitions. For his entry fee, each player gets five virtual golf balls to hit. Starting from a given par three hole, any hole-in-one is awarded with a prize. To prevent players from eventually discovering the optimal mix of parameter inputs (foot placement, force of swing, etc.), game characteristics such as pin placement, tee location, and sand trap location could be varied for every tournament. Course configurations would be stored in the tournament database for every course.

Another popular electronic game format involves answering questions with deterministic answers, such as trivia games. Players are presented with questions that have a definite answer. This type of game format is particularly well suited to online tournaments since the amount of information exchanged between the central controller and the I/O devices is minimal due to the text-based nature of the game. A question might require the player to type in the correct answer, or select from a list of potential answers. Linked to the tournament database would be a database devoted to storing questions and answers, from which trivia tournaments would extract questions. In addition to thousands of questions and answers, this database would contain fields for the category of question (sports, movies, geography, etc.), the date in which the question entered the database, the number of times the question had been used, the difficulty of the question (predicted by the tournament organizers), and a list of tournaments that had already used the question. This last database field is especially important given the time and expense associated with creating questions and answers, since the re-use of some questions is almost inevitable. While tournament organizers obviously do not want to have players seeing questions for the second time, they also do not want to throw out a question that only a small percentage of potential tournament participants have seen. Databases provide the best compromise since it is possible to track exactly which tournaments (and thus what players) have seen a question. When questions are selected for a given tournament, the database would be searched to see whether any player in this tournament had participated in another tournament which had already seen the question.

Databases also make possible tournaments in which teams of players each gets different questions. On a four player team, the first team member may get the most difficult question while the fourth member of the team may always get the easiest question. The database would simply match the difficulty of the question with player team status.

With dozens of tournaments occurring simultaneously, and players competing in multiple tournaments at the same time, another function of the tournament database is to track which players are entered in what tournaments.

Prediction games are also gaining popularity in online environments. These games involve the player predicting the outcome of a future event, such as the price performance of a stock over the next thirty days or the temperature of a group of cities the following day at noon. Because player selections must be stored until the event in question has transpired, a database is an essential component of the tournament. The database is especially useful for prediction tournaments in which the player chooses from a selection of target performance levels. Players in a weather prediction tournament might choose five cities from a selection of one hundred, and may also choose the hour at which their temperature prediction is to be assessed for each chosen city. The database would contain fields for possible cities, chosen cities, temperatures, and times.

Puzzle games have been popular for many years. Examples include crossword puzzles, jigsaw puzzles, Rubik's Cube, etc. In one embodiment, the puzzle is posted on the World Wide Web at noon on Saturday. Players submit their answers to the game controller with the first three correct responses receiving a prize or advancing to a further game session. In a jigsaw puzzle competition, teams of players compete to put together an electronic jigsaw puzzle in the shortest time. A puzzle database tracks which players are on which teams, and prevents unauthorized players from participating in puzzles.

Strategy games are also well represented in online tournaments, partly because there have been parallels in the off-line world for so many years in the form of tournament chess, backgammon, bridge, etc. Although the result is a discrete win/lose/draw, the manner in which the player attains the result is critical. There is no such thing as a "correct" answer. An online chess tournament might start with sixty-four players, dropping to half that number each game session as players are eliminated.

Support for complex pairing/matching systems is one of the key benefits provided by tournament databases. After each game session of a Swiss-system (nonelimination) chess tournament, for example, players must be paired again with a different opponent. Information such as the number of previous wins/losses, the color allocation, and the rating of the player all must be incorporated into the pairing in order to ensure the fairness of the competition. Databases also offer the ability to incorporate player preferences into the pairings, allowing a player to list preferred opponents, or people with whom he would rather not play.

Because some strategy tournaments such as chess take place over days or even weeks, database systems are especially useful in maintaining order. These databases can communicate with an email system to provide a tournament coordination system in which players are being constantly informed as to when and with whom their next game is scheduled.

Judgment games require human judgment to establish who will advance to the next game session or win a prize. Examples include essay writing tournaments or art tournaments. Because these forms of competition have no "correct" answer, they obviously cannot be evaluated by computer and so require the participation of human judges. In an exemplary essay writing tournament, players submit a short essay for scoring by a panel of three judges. The average of these three scores is then compared with the scores of other participants. The top ten percent of the scores, for example, could qualify to advance to the next game session in which a new, possibly more lengthy or detailed essay, was submitted. Judgment tournaments are not restricted to text-based entries. In a skating tournament, participants could videotape their skating performance and send a digitized version to the central controller for judging in much the same way that the written essays were submitted.

The database record for every tournament participant might contain all of their submissions to judgment tournaments. This would prevent a player, for example, from submitting the same essay to more than one essay tournaments since all essay submissions could be checked against past submissions.

Databases of judges scores would allow tournament organizers to check the comparability of their scores, determining whether one judge was consistently giving low marks, or whether some judges were giving excessively high marks to a particular player.

Tournaments can also be based on games of luck or chance in which a player has no control over his progression through the tournament. One example is a slot machine tournament in which advancement to the next game session depends on the slot machine payout over the current game session. Since the slot machine payout is determined randomly, each participant in the tournament has the exactly same chance to win. A database of all slot machine outcomes would of course be helpful in verifying the randomness of the algorithms used to create the outcomes.

Lastly, tournaments in which time to completion is the primary method of differentiating among players are also popular. One example is electronic car race simulations in which the shortest lap times receive prizes or awards. A tournament might consist of ten laps around a track, with the shortest time to completion declared the winner.

Many games, of course, exhibit characteristics from two or more of the above categories. A poker tournament, for example, contains elements of both strategy (the way you bet) and luck (the cards you draw).

Tournaments may be held contemporaneously with a live event. A trivia tournament, for example, could be based on a popular television situation comedy with questions based on the actions of characters in the show. Questions could also be asked regarding the anticipated actions of the show's characters, creating a prediction format for the tournament.

In one preferred embodiment, there may be several different game formats represented in a tournament or game session. A tournament, for example, may start with three groups of players—one group answers trivia questions, the next solves a crossword puzzle, while the last group plays electronic football. Qualification to advance to the next game session is based on a player's performance relative to the mean performance of their own group. Each player's score is normalized by converting it into a number of standard deviations above or below the mean. Comparisons are then made among players competing in entirely different games. Any player scoring better than one standard deviation above the mean of his group qualifies for advancement to the next round. In addition to the normalization process, standard deviations can be subjectively adjusted by some numeric constant in order to reflect a perceived difference in the difficulty of the different game formats.

Another variation is to have competitors play the same game format, but with different game parameters. In a golf game, for example, the trajectory of the ball may be affected by wind speed, humidity levels, slickness of the grass, etc. Two competitors hitting a ball with the same club using the same force and the same foot placement might have their ball land in a different spot due to the different game parameters. The wind for one player's shot my be five miles per hour out of the East, while the second player faced a wind speed of twenty miles per hour out of the South.

In another preferred embodiment, the difficulty level of a game session is adjusted as the game session is played. In a conventional trivia tournament, for example, the difficulty of the questions is determined in advance. A tournament might have a series of ten questions that are prepared before the contest. A prize may be awarded to the player with the best score. If there are a large number of participants, however, there may be a number of perfect scores at the end of the contest. In order to increase the probability that there is only one winner at the end, more difficult questions can be used. The problem with this strategy, however, is that less skilled players will feel frustration because of their poor performance. Ideally, questions would become more difficult only if it seemed as though there was a chance of multiple perfect scores. This would allow easy or moderate questions at the beginning of the game to make beginners feel more comfortable, while allowing for more difficult questions to be included if more differentiation is required. Reflexive software provides just such a solution. A pool of game questions are assigned a difficulty level in advance. The first question of the contest is always fairly easy, but the difficulty of subsequent questions is based on the accuracy rate achieved on prior questions. If players are doing well, the questions get harder. Although these techniques are well suited to trivia games, they are also applicable to almost any other game format.

In one preferred embodiment, the time window for a game session has a fixed end time, which means that all the games within the game session must be completed by a certain time. The fixed end time for the game session could be applied only to players in contention for prizes. In a crossword puzzle tournament, for example, after the fixed end time for the final game session has been reached the winners have already been determined. Players who have not yet finished the puzzle can of course continue to work on it beyond the fixed end time, although they are out of contention for prizes.

In another preferred embodiment, the time window for a game session has a fixed start time, which means that all the games or questions within the game session start at the same time. As an example, trivia games preferably should have a fixed start time since a player who starts later would have the advantage of knowing the questions posted to players who had started earlier. This would give the later player the ability to look up the answers in advance of answering them himself, resulting in an unfair advantage. Not all game formats require a fixed start time. Dexterity game formats, for example, may involve a staggered start of players. In a closest to the pin golf tournament, a player beginning after another player has finished is at no particular advantage or disadvantage.

Figure 7:
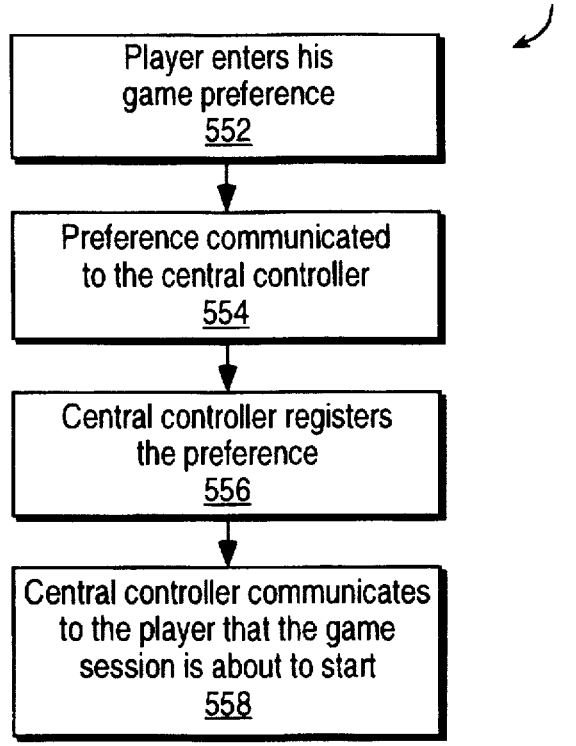
FIG. 7 shows one preferred set of steps for a player to play in a specific game session with a fixed start time in the present invention.

One preferred embodiment notifies a player of impending start or end times for tournaments. FIG. 7 shows an example of such a notification process 550 for a tournament with a fixed start time. In that example, the game session has a number of game formats. First, the player enters 552 the game format he prefers to play via the associated I/O device. The preference is communicated 554 to the central controller, which registers 556 the preference. When the game session is five minutes from starting, the central controller sends a start message 558 to the I/O device of the player through the communication network. This communication would typically be electronic mail, although it could take other forms such as audible or visual alerts. Similar mechanisms may be used to alert the player that a game session is about to end.

Note that the game software described does not have to reside completely at the central controller. Part of the game software may reside in the central controller and part of it may reside within the I/O device. This configuration can be implemented in a client/server environment. In the case of an online tournament golf game, for example, if the client/server model is not used then the I/O device acts as a dumb terminal. All of the game software resides on the game controller (server machine), receiving input from the I/O device and sending back the results. The game parameters such as club selection and force of swing are transmitted to the game controller which calculates the new position of the ball. A graphics screen depicting the new ball placement is then downloaded to the I/O device. Because the downloading of detailed graphics screens is such a bandwidth-intensive function, the time of transmission is normally long. Players are forced to wait for a period of time even with relatively fast modems. Although increasing modem speeds are beginning to alleviate these delays in the transmission of graphics, game software graphics usually increase in screen resolution (and hence bandwidth requirement) as new versions are released, partially counteracting the hardware improvements.

Switching to a client/server model for bandwidth-intensive functions may be more appropriate. In the case of the golf game described above, much of the game software can be handled by the I/O device. The I/O device would send the game parameters up to the central controller which would calculate the coordinates of the new ball position. These coordinates would then be sent back down to the I/O device where the game software would generate the graphics display of the new ball position. The time of data transmission is dramatically reduced since no bandwidth intensive functions (transmission of graphics) are required.

There are many different ways for a player to pay his entry fee. In one preferred embodiment, the process steps 204 responsive to payment of an entry fee include the step of providing a number of payment options for the player before he participates in a game session. Payments may be processed non-electronically, such as with cash or checks, or may be communicated electronically with the online transmission of credit card number, digital cash, debit card number, or bank account information for electronic fund transfers. Players may also register any one of the above electronic payment methods with the central controller and then simply use a unique payment identification number for future transactions. A player, for example, could register his credit card number and a password with the central controller. From that time forward, the player would only have to present his password for payment. The central controller would look up the password to find the player's credit card number and would bill the card for the tournament entry fee. This preferred embodiment has the added advantage of eliminating the need for secure transmission of the payment information. A hacker intercepting the player's payment communication with the central controller would get only the password, not the more valuable credit card number. The password has little value as any winnings obtained from the use of another player's account would be credited to that player's credit card and thus would not benefit the hacker.

Figure 8:
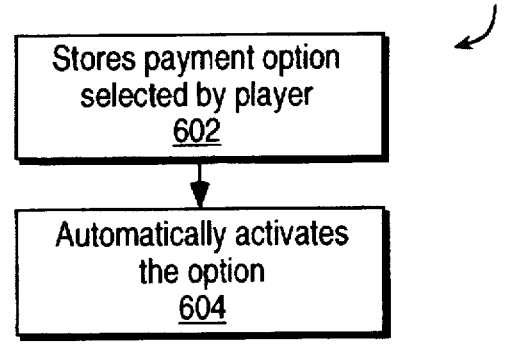
FIG. 8 shows one preferred set of payment steps in the present invention.

FIG. 8 shows another type 600 of payment option in which the player approves automatic payments. The player first chooses a preferred method of payment, such as by credit card. This preference is stored 602 at the central controller. The payment option is then activated 604 by any tournament activity by the player. If the player's unique identifier is used in tournament registration, his credit card is automatically charged for the appropriate amount.

The entry fee can also be tied to the amount of time that the player participates in the tournament -- the longer he plays, the larger the entry fee. In this preferred embodiment, the tournament system keeps track of the amount of time the player spends in the tournament, billing the player at the end of the tournament. This procedure may be applicable in a flight simulator tournament in which players score points for perfect landings. The more time the player spends at the simulation, the greater the number of opportunities to land.

Much like a student who must complete required prerequisite courses before attending higher level classes, participation in some tournaments may require a confirmation of the player's performance data. Entry into the Star Trek Master's tournament, for example, might require previous participation in at least five of seven Star Trek category tournaments. When the player tries to register for the Master's tournament, the central controller looks up the player's unique identifier to check past performance data. If the performance data do not meet the criteria of the tournament, registration is denied. The player is given a list of the missing qualifications, as well as the starting times of future tournaments that would satisfy those criteria.

Prior tournament history can also be used to handicap players. In registering for a golf tournament, for example, part of the registration process involves the central controller checking to see whether the player has won any prior tournaments, or whether he has simply played in many tournaments. The player receives a handicap value from one to ten, depending on his level of experience. When the tournament starts, players with the most experience start from the tees farthest away from the pin, and face the strongest winds.

A database system allows for creative applications of a common prize pool, which is a set of prizes not associated with a particular tournament. If there are ten trivia tournaments, for example, there could be a prize for the longest string of consecutive correct answers. This could be the longest string within a given tournament, or it could span tournaments so that a player finishing a tournament with a string of correct answers could continue this string in the next tournament he enters. The common prize pool thus spans a number of individual tournaments. Other criteria that could be used include the greatest number of standard deviations above the mean, the greatest number of standard deviations above the lowest score, the best score by a senior citizen, the most consecutive correct answers by a player under thirty years of age, etc.

Databases also allow for entry fees to be paid based on the actions taken within the tournament. In a hole-in-one tournament, players could hit as many balls as they want to, but would be charged for each ball that they hit. In this respect, entry fees are no longer paid in advance, but after the tournament. The number of balls hit can be stored in a database so that the player can participate in multiple tournaments before paying.

Tournament promotions can make extensive use of the information contained within the tournament database. Electronic mail about future bridge tournaments, for example, can go out to any player participating in at least two bridge tournaments in the last year. Tournament databases would also be valuable to companies promoting goods and services. Star Trek videos, for example, could be marketed to those players competing in at least three Star Trek tournaments per year.

Player complaints about activity from prior tournaments are easily handled by the tournament database. If a player complains that he has not received payment for a tournament victory six months prior, the central controller would pull up the database record for that tournament to see if the player was indeed one of the winners. If he was, the central controller would then access the player's database record to discover whether or not he had been paid.

Normally, tournament prizes are established before the tournament begins. In one preferred embodiment, however, the prizes for a game session depend on the number of players participating in the game session -- the more players participating, the larger the prizes.

In another preferred embodiment, each I/O device includes secure memory (RAM, ROM, EPROM, EEPROM, and the like) for storing tournament data. This memory is contained within a secure perimeter, which may include physical, electronic, or a combination of physical and electronic features to resist tampering. For example, physical features could include encapsulation while electronic features could include a silicon firewall. Combination features could include self-zeroing, or otherwise volatile memory, or memory that electrically modifies its contents upon detection of tampering. Such tampering might include physically stressing the device, attempting to change the clock rate by replacing the external power source with a battery outside allowable current or voltage ranges, or attempting to change the clock rate by replacing external power sources with an AC power source operating outside an allowable frequency range. Alternatively, the secure perimeter could be merely tamper-evident. In that case, the device might be returned to the tournament organizers before any large prize could be claimed. As will be appreciated by those skilled in the art, a great variety of tamper-resistant/tamper-evident techniques can be deployed, and will not be enumerated in detail herein. Therefore, as a matter of convenience, terms such as "tamper resistant/tamper-evident" or "secure" shall be understood to refer to any of the aforementioned or other security measures throughout this discussion.

Many preferred tournament embodiments are improved through the use of a secure perimeter. One example is a puzzle tournament in which the time to solution is the critical component of the player's score. One game session may require the player to solve ten short puzzles with the number of seconds required to solve the puzzles being the player's score for that game session. If there is a delay in the communication of the player's answers, perhaps due to latency problems in the online network, the player is penalized by factors outside of his control. If the times of puzzle completion are stored locally in the secure perimeter of the player's I/O device, however, the player may not be penalized. His times would be sent to the central controller at the end of the game session and compared with the times registered by the game controller over the online connection.

The player would be credited with the times registered by the processor within the secure perimeter of the I/O device. The secure tamper-resistant nature of the secure perimeter would prevent players from altering their times to solution before they were sent to the central controller.

Payment information likewise benefits from the use of a secure perimeter. An I/O device may store cryptographic keys within the secure perimeter to encrypt credit card information before it is communicated to the game controller.

Figure 9:
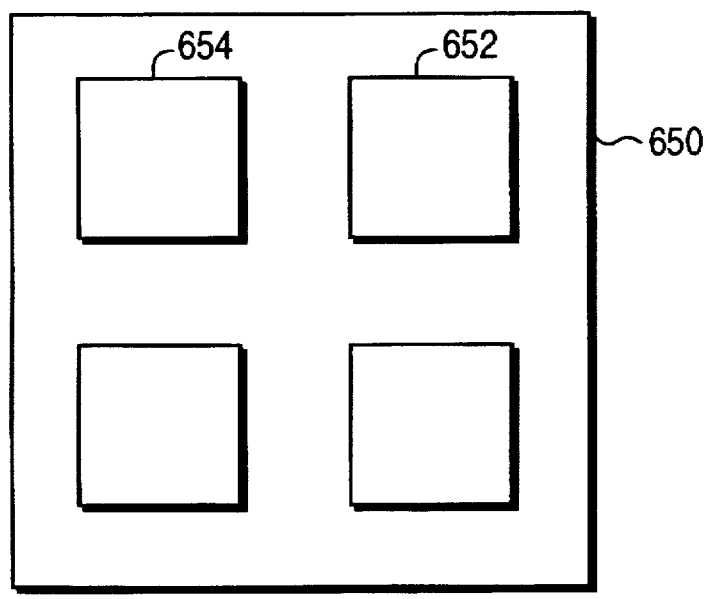
FIG. 9 shows a screen with a plurality of windows in the present invention.

FIG. 9 shows another preferred embodiment, in which each I/O device includes a screen 650 having multiple windows 652, 654 thereon, with one window 652 displaying the tournament game session in which the associated player is currently participating. The other windows may be displaying documents that the player is working on, while he is playing in the tournament. In one preferred embodiment, the player may enter preferences that determine the size of the window displaying the tournament game session. This entering process can be similar to the player entering his game format preference, as shown in FIG. 7. A player might opt to have the game session window take up a small portion of the I/O device screen at the beginning of a tournament, but expand to a full sized window as the player advances to further game sessions of a given tournament. Thus, the tournament window expands as the possibility of receiving prizes increases.

In one preferred embodiment, the database includes the following fields, and each field includes the corresponding information:

1. Player Information/Demographics
   Name
   Address
   Age
   Sex
   Preferences
   Billing Type
   Favorite tournament format
   Start/stop times
   Opponents
   Language
2. Billing Systems
   Credit card numbers of players
   Bank account numbers for electronic fund transfer (EFT)
   Digital cash accounts
   Total revenues
   Aging of accounts receivable
   Desired frequency of billing
   Billing dates
   Payment dates
   Mailing addresses for prize payments by check
3. Tournament Information
   Format (trivia, strategy, prediction, etc.)
   Start date/time
   Stop date/time
   Duration of tournament
   Scheduled breaks
   Scheduled times for player notification/warning
   Prizes
   Players currently registered
   Players currently logged on
   Cash entry fees received
   Credit entry fees received
   Number of game sessions
   Player qualification requirements
   Requirements for advancement to subsequent game sessions
4. Player history
   List of tournaments played
   Prizes won
   Average score
   Number of times in final round
   Average time to answer
   Entry fees paid
5. Question/Parameter/Answer Database
   Format (trivia, strategy, etc.)
   Creation date
   Difficulty
   Number of times it has been used
   Tournaments that it has been used in
   Scheduled deletion date
   Percentage of correct responses
   Parameter values (wind speed, speed of greens, etc.)
   Results of prediction variables The above-described database fields are not meant to be a comprehensive description of a tournament database system. It will be understood by those skilled in the art of tournaments that there are many other possible variations.

Other preferred embodiments of the invention will be apparent to those skilled in the art from a consideration of this specification or practice of the invention disclosed herein. It is intended that the specification and examples be considered as exemplary only, with the true scope and spirit of the invention being indicated by the following claims.

I claim:

1. A distributed electronic tournament system in which a plurality of remotely located players participate in a tournament through input/output devices connected to a central controller which manages the tournament, the system comprising:

(a) means for uniquely identifying one of the players communicating with the central controller via one of the associated input/output devices:

(b) means for allowing the player to participate in the tournament via the associated input/output device upon payment of an entry fee: and (c) means for storing in database player information that is generated as the player participates in a game of the tournament, such information being available for use in a subsequent tournament, which is administered by said controller wherein a pre-determined number of positions for players are reserved for a selected group of players until the tournament is a preset time away, at which time the reserved positions will be made available to all players.

2. A distributed electronic tournament system in which a plurality of remotely located players participate in a tournament through input/output devices connected to a central controller which manages the tournament, the system comprising:

(a) means for uniquely identifying one of the players communicating with the central controller via one of the associated input/output devices:

(b) means for allowing the player to participate in the tournament via the associated input/output device upon payment of an entry fee and (c) means for storing in database player information that is generated as the player participates in a game of the tournament, such information being available for use in a subsequent tournament, which is administered by said controller, wherein the means responsive to payment of an entry fee:

provides a plurality of payment options;

stores a payment option selected by the player in the tournament; and automatically activates the selected payment option after the player has been identified in a subsequent tournament.

3. A distributed electronic tournament system in which a plurality of remotely located players participate in a tournament through input/output devices connected to a central controller which manages the tournament, the system comprising:

(a) means for uniquely identifying one of the players communicating with the central controller via one of the associated input/output devices;

(b) means for allowing the player to participate in the tournament via the associated input/output device upon payment of an entry fee; and (c) means for storing in database player information that is generated as the player participates in a game of the tournament, such information being available for use in a subsequent tournament, which is administered by said controller, wherein the game has associated therewith a difficulty level which is adjusted as the tournament is played based on the information generated during participation in the game.

4. A distributed electronic elimination tournament system in which a plurality of remotely located players participate in a tournament having multiple game sessions through input/output devices connected to a central controller which manages the tournament, the system comprising:

(a) means for uniquely identifying a player communicating with the central controller via an associated input/output device;

(b) means for allowing the player to participate in a particular game session via the associated input/output device upon payment of an entry fee; and (c) means for determining whether the player has been qualified to advance to a subsequent game session based on player information generated during participation in the particular game session, wherein at least one player from the particular game session is eliminated; and (d) means for permitting each player qualified to the subsequent game session to participate in the subsequent game session, wherein the game session has a starting time and wherein a pre-determined number of reserved positions for players are reserved for a selected group of players until the starting time of the game session is a preset time away, at which time the reserved positions will be made available to all players.

5. A distributed electronic elimination tournament system in which a plurality of remotely located players participate in a tournament having multiple game sessions through input/output devices connected to a central controller which manages the tournament, the system comprising:

(a) means for uniquely identifying a player communicating with the central controller via an associated input/output device;

(b) means for allowing the player to participate in a particular game session via the associated input/output device upon payment of an entry fee;

(c) means for determining whether the player has been qualified to advance to a subsequent game session based on player information generated during participation in the particular game session, wherein at least one player from the particular game session is eliminated; and (d) means for permitting each player qualified to the subsequent game session to participate in the subsequent game session, wherein the means for a player to pay an entry fee includes:

means for providing at least one payment option;

means for storing a payment option selected by a player in the particular game session; and means for automatically activating the selected payment option after the player has been identified in the subsequent game session for payment of a subsequent game session entry fee.

6. A distributed electronic elimination tournament system in which a plurality of remotely located players participate in a tournament having multiple game sessions through input/output devices connected to a central controller which manages the tournament, the system comprising:

(a) means for uniquely identifying a player communicating with the central controller via an associated input/output device;

(b) means for allowing the player to participate in a particular game session via the associated input/output device upon payment of an entry fee;

(c) means for determining whether the player has been qualified to advance to a subsequent game session based on player information generated during participation in the particular game session, wherein at least one player from the particular game session is eliminated; and (d) means for permitting each player qualified to the subsequent game session to participate in the subsequent game session, wherein the particular game session has a difficulty level and further comprising a means for adjusting the difficulty level as the particular game session is played based upon information generated during play of the particular game session.

7. A method of using a distributed electronic tournament system in which a plurality of remotely located players participate in a tournament through input/output devices connected to a central controller which manages the tournament, the method comprising the steps of:

uniquely identifying a player communicating with the central controller via an associated input/output device;

allowing the player to participate in the tournament via the associated input/output device upon payment of an entry fee by the player, the tournament occurring within a time window;

storing player information that is generated as the player participates in a game of the tournament; and restricting player reservation to a selected group of players until a predetermined time prior to the tournament.

8. A method of using a distributed electronic tournament system in which a plurality of remotely located players participate in a tournament through input/output devices connected to a central controller which manages the tournament, the method comprising the steps of:

uniquely identifying a player communicating with the central controller via an associated input/output device;

allowing the player to participate in the tournament via the associated input/output device upon payment of an entry fee by the player, the tournament occurring within a time window;

storing player information that is generated as the player participates in a game of the tournament; and adjusting the game based on the player information.

9. The method of claim 8 wherein the tournament has a difficulty level and the step of adjusting the game includes adjusting the difficulty level based on the player information.

10. A distributed electronic tournament system for administering a first game, and a second game, the system comprising:

- a plurality of input/output devices, each input/output device including an input component for receiving player input: and
- a central controller coupled to the input/output devices including a memory and a processor coupled to the memory, the processor configured to store player information during occurrence of the first game based on the player input and retrieve the stored player information during occurrence of the second game, wherein the first game and the second game are part of the same tournament.

11. A method of using a distributed electronic tournament system in which a plurality of remotely located players participate in tournaments through input/output devices coupled to a central controller which manages the tournament, the method comprising the steps of:

uniquely identifying a player communicating with the central controller via an associated input/output device;

upon payment of a first entry fee by the player, allowing the player to participate in a first tournament via the associated input/output device, the first tournament occurring within a time window;

storing player information that is generated as the player participates in a game of the first tournament;

retrieving the player information during a second tournament subsequent to the first tournament;

receiving a first payment option for payment of the first entry fee in the first tournament;

storing the first payment option;

retrieving the stored first payment option; and paying a second entry fee in accordance with the stored first payment option.

12. A method of using a distributed electronic tournament system in which a plurality of remotely located players participate in a tournament including at least one challenge through input/output devices connected to a central controller which manages the tournament, the method comprising the steps of:

uniquely identifying a player communicating with the central controller via an associated input/output device;

allowing the player to participate in a tournament via the associated input/output device upon payment of an entry fee;

generating a first challenge for a first player based on a first contemporaneous event and generating a second challenge for a second player based on a second contemporaneous event;

communicating each challenge to the associated input/output device;

generating an outcome associated with the first player;

generating a second outcome associated with the second player; and statistically normalizing the outcomes.

* * * * *

UNITED STATES PATENT AND TRADEMARK OFFICE
CERTIFICATE OF CORRECTION

PATENT NO. : 5,779,549
DATED : July 14, 1998
INVENTOR(S) : Jay S. WALKER et al.

It is certified that error appears in the above-identified patent and that said Letters Patent is hereby corrected as shown below:

Claim 1(c), column 18, line 46 add -- a -- after "in" and before "database"
Claim 2(c), column 19, line 1 add -- a -- after "in" and before "database"
Claim 3(c), column 19, line 24 add -- a -- after "in" and before "database"

Signed and Sealed this

Seventh Day of November, 2000

Attest:

Q. TODD DICKINSON

*Attesting Officer*   *Director of Patents and Trademarks*